United States Patent
Colgan et al.

(10) Patent No.: US 6,176,937 B1
(45) Date of Patent: *Jan. 23, 2001

(54) PROCESS FOR TREATING A METAL SURFACE WITH AN ACIDIC SOLUTION CONTAINING HYDROGEN PEROXIDE AND A STABILIZER

(75) Inventors: Sarah J. Colgan, Warrington; Neil J. Sanders, St. Helens; Colin F. McDonogh, Warrington, all of (GB)

(73) Assignee: Solvay Interox Limited, Warrington (GB)

( * ) Notice: Under 35 U.S.C. 154(b), the term of this patent shall be extended for 0 days.

This patent is subject to a terminal disclaimer.

(21) Appl. No.: 09/531,601

(22) Filed: Mar. 20, 2000

Related U.S. Application Data

(62) Division of application No. 09/284,023, filed as application No. PCT/GR97/02725 on Oct. 6, 1997.

(30) Foreign Application Priority Data

Oct. 7, 1996 (GB) .................................................. 9620877

(51) Int. Cl.[7] .................................................... C23G 1/00
(52) U.S. Cl. ................ 134/3; 134/2; 134/22.17; 134/22.19; 134/26; 134/28; 134/29; 134/34; 134/36; 134/41; 134/42; 134/902; 510/245; 510/254; 510/367; 510/369; 510/375; 510/495; 252/186.28
(58) Field of Search .................... 134/2, 3, 22.17, 134/22.19, 26, 28, 29, 34, 36, 41, 42, 902; 510/254, 245, 367, 369, 375, 495; 252/186.28

(56) References Cited

U.S. PATENT DOCUMENTS

| | | | | |
|---|---|---|---|---|
| 3,122,417 | * | 2/1964 | Blaser et al. | 23/207.5 |
| 3,537,895 | * | 11/1970 | Lancy | 134/3 |
| 3,556,883 | * | 1/1971 | Naito | 156/20 |
| 3,801,512 | * | 4/1974 | Solenberger | 252/186 |
| 3,869,401 | * | 3/1975 | Ernst | 252/186 |
| 4,059,678 | * | 11/1977 | Winkley | 423/273 |
| 4,770,808 | * | 9/1988 | McDonogh et al. | 252/186.29 |
| 5,364,549 | * | 11/1994 | McDonogh | 252/79.4 |

FOREIGN PATENT DOCUMENTS

| | | | |
|---|---|---|---|
| 0351772 | * | 1/1991 | (EP) . |
| WO91/05079 | * | 4/1991 | (WO) . |
| WO93/04216 | * | 3/1993 | (WO) . |
| WO98/15674 | * | 4/1998 | (WO) . |

OTHER PUBLICATIONS

McDonogh C.F. Treatment of Metal Surfaces with Hydrogen Peroxide. Tijdschr. Oppervlaktetech. Mater. 31(7) 156–60, 1987.*

* cited by examiner

Primary Examiner—Sharidan Carrillo
(74) Attorney, Agent, or Firm—Larson & Taylor PLC

(57) ABSTRACT

Aqueous acidic solutions of hydrogen peroxide used for metal surface treatments suffer from an increased decomposition rate of the hydrogen peroxide, caused by the dissolved metals such as iron, copper or titanium. A method is provided wherein stabilization can be achieved by employing a combination of a) a hydroxybenzoic acid, preferably p-hydroxybenzoic acid; b) a hydrotropic sulphonic acid, preferably p-toluene sulphonic acid; and c) a hydrophobic alkaryl sulphonic acid, preferably dodecylbenzene sulphonic acid.

14 Claims, No Drawings

PROCESS FOR TREATING A METAL SURFACE WITH AN ACIDIC SOLUTION CONTAINING HYDROGEN PEROXIDE AND A STABILIZER

CROSS REFERENCE TO RELATED APPLICATIONS

This application is a divisional application of U.S. Ser. No. 09/284,023 filed May 25, 1999, which is a 371 of PCT/GB97/02725, filed Oct. 6, 1997.

BACKGROUND OF THE INVENTION

This invention concerns metal surface treatment and in particular a process for metal surface treatment employing hydrogen peroxide in aqueous acidic solution, a solution containing hydrogen peroxide for treating metal surfaces and a stabiliser system for stabilising hydrogen peroxide.

During metal processing, a metal oxide layer is often formed over all or part of the metal surface, impairing its appearance and/or suitability for further processing steps. Thus, for example, such a problem can arise for steel, including stainless steel, titanium and its alloys, copper and its alloys and even in some circumstances for aluminium. Accordingly, it is desirable to remove or at least reduce the size and extent of the metal oxide layer. Such processes can be described as metal surface cleansing, or in some instances more particularly as metal pickling or polishing or desmutting depending on the specific treatment being carried out. In one class of processes, a solution of hydrogen peroxide is employed, and often an aqueous acidic solution to remove the oxide layer.

During the course of the metal surface treatment, the removal of the oxide layer causes metal to pass into solution. It is uneconomic and wasteful of resources to discard metal treatment solutions frequently, so that over the course of time, the concentration of metal in solution increases. The metals which pass into solution are usually the commonly employed metals such as iron, copper and metals alloyed with them such as nickel, chromium and titanium. Also in some treatment processes such as in steel pickling, it is often the metal, ie iron, in solution which carries out much of the oxidation, and accordingly a significant concentration if the metal is deliberately maintained from the start of the process. These metals in acidic solution catalyse the decomposition of hydrogen peroxide so that it is desirable to find means of minimising the rate and/or extent to which the hydrogen peroxide decomposes.

In order to retard peroxide decomposition in acidic solution, it has been proposed hitherto to include a number of different inorganic or organic substances, which can often be alternatively described as chelating agents or free radical inhibitors. Without being limited to the particular mechanism by which stabilisation, ie peroxide decomposition retardation, is achieved, a number of the stabilisers can be described chemically as alcohols (U.S. Pat. No. 3,869,401, U.S. Pat. No. 3,556,883), carboxylic acids (U.S. Pat. No. 3,537,895), phosphonic acids (U.S. Pat. No. 3,122,417 U.S. Pat. No. 4,059,678) or sulphonic acids (U.S. Pat. No. 3,801,512). Amongst the lists of stabilisers proposed for acid solutions, p-hydroxybenzoic acid has been disclosed in WO 91/5079 (Solvay Interox Limited).

BRIEF SUMMARY OF THE INVENTION

It is a first object of certain aspects of the present invention to provide stabilisation means for aqueous acidic solutions of hydrogen peroxide, hydrogen peroxide solutions so stabilised and the use of such solutions for treating metals.

It is a second object of further or related aspects of the present invention to provide means for augmenting or improving the stabilisation of hydrogen peroxide using a hydroxybenzoic acid, hydrogen peroxide solutions so stabilised and their use for treating metals.

DETAILED DESCRIPTION OF THE INVENTION

According to the present invention, there is provided a stabiliser for aqueous acidic hydrogen peroxide including a hydroxybenzoic acid characterised in that it comprises
  a) from 80 to 200 parts and preferably 100 to 150 parts by weight of a hydroxybenzoic acid
  b) from 50 to 120 parts and preferably from 60 to 100 parts by weight of a hydrotropic aryl sulphonic acid
  c) from 2.5 to 6 parts and preferably from 3 to 5 parts by weight of a hydrophobic alkaryl sulphonic acid.

Herein by the term hydroxybenzoic acid is meant an aryl group—substituted by at least one hydroxy group and by a carboxylic acid group in any position relative thereto. A particularly suitable compound within the term comprises p-hydroxybenzoic acid.

Herein by the term hydrotropic aryl sulphonic acid is meant an aryl group that is substituted by at least one short chain alkyl group and a sulphonic acid group in any position relative thereto and containing not more than 9 carbon atoms in total. A particularly suitable example, by virtue of its ready availablility and effectiveness is p-toluene sulphonic acid.

Herein by the term hydrophobic alkaryl sulphonic acid is meant an aryl sulphonic acid which is substituted by a hydrophobic alkyl group containing at least 8 carbons. Said alkyl group often contains from 10 to 20 linear carbons, usually unbranched, and in many instances from 10 to 14 carbons or mixtures, such as dodecyl or mixtures averaging about 12 carbons. A particularly suitable example is dodecylbenzene sulphonic acid, which often contains also a fraction of decyl, undecyl, terdecyl and tetradecyl groups.

In particularly preferred stabiliser compositions, the weight ratio of each of components a) : b) : c) is selected in the range of 30:20:1,±20%. In a number of related compositions containing preferred ratios, the weight ratio of component a) to component b) to component c) is selected in the range of 18 to 25:20:0.8 to 1.2.

By the employment of the three components together in the amounts and ratios disclosed above, and especially using preferred or especially ratios of the components, it is possible to obtain improved stabilisation of hydrogen peroxide in acidic solutions compared with the use of the hydroxybenzoic acid alone. Accordingly, the stabiliser of the present invention is particularly beneficial in those circumstances in which free hydrogen peroxide is maintained in solution.

Although the three components of the stabiliser are referred to as the respective acids, it will be recognised herein for each of components a), b) and c) this includes employing or introducing the component as the corresponding salt thereof for all or part of each component of the stabiliser. In use, the acidity of the metal treatment solution will dictate the chemical form and extent of ionisation of the respective component therein. To the extent that a salt is employed, such as an alkali metal (sodium) salt, then its weight is as calculated as the corresponding acid. If desired, the compositions can be at least partially neutralised by the introduction of a water-soluble alkali such as an alkali metal hydroxide, eg sodium hydroxide.

According to a second aspect of the present invention there are provided acidic metal treatment solutions containing or into which is introduced hydrogen peroxide, and containing or into which is introduced a stabiliser characterised in that the stabiliser comprises a) from 80 to 200 parts and preferably 100 to 150 parts by weight of a hydroxybenzoic acid b) from 50 to 120 parts and preferably from 60 to 100 parts by weight of a hydrotropic aryl sulphonic acid c) from 2.5 to 6 parts and preferably from 3 to 5 parts by weight of a hydrophobic alkaryl sulphonic acid.

The acidity in the aqueous metal treatment solutions is typically provided by one or more mineral acids and particularly acids selected from sulphuric, phosphoric, hydrofluoric and hydrochloric acids, the selection being made at the discretion of the person wishing to conduct a metal treatment and taking into account which acids and mixtures thereof at what concentrations are suitable for the metal being treated. Additionally, if desired, a fraction of the acidity can be provided by nitric acid. The solutions intended for metal surface treatment are conventionally formulated to have a measured pH of 2 or lower, and in many instances the pH is chosen in the region of from below pH 0, eg pH-0.5 up to pH 1. It will be understood that the measured pH will arise from the interaction between the acids introduced and any other constituents in the solution. For example, and as is well known, HF complexes in solution with Fe cations releasing H+ ions and thereby lowering the measured pH compared with a plain HF solution devoid of Fe ions. It will also be understood that the skilled man will select the acid concentrations dependent on the metal treatment operation being contemplated. The highest concentrations relate to metal pickling and lower concentrations relate to polishing operations.

The concentrations of the various acids in the metal treatment bath are selected in many embodiments in the ranges identified below, to provide in combination a suitable pH of 2 or below.

sulphuric acid (25 to 250 g/l) and/or phosphoric acid up to 250 g/l, and often from 2 to 50 g/l for polishing and 50 to 200 g/l for pickling hydrofluoric acid and/or hydrochloric acid up to 100 g/l and often from 10 to 50 g/l It will be recognised that for certain purposes, combinations of acids are particularly suitable. For example, for pickling steel, especially stainless steels, or titanium, it is desirable to employ sulphuric acid at a concentration of 50 to 150 g/l and hydrofluoric acid at a concentration of from 20 to 35 g/l. It will be recognised that when stainless steel is being treated, the stabiliser is particularly effective when the iron in solution is complexed, such as with fluoride. For pickling copper or desmutting aluminium, it is desirable to employ a sulphuric acid solution at a concentration of 100 to 250 g/l.

The hydrogen peroxide in the acid solution can be consumed rapidly, for example if its primary function is to oxidise in situ a species such as ferrous ions, possible maintaining a desired mole ratio between ferrous and ferric ions in solution. Alternatively, a positive hydrogen peroxide concentration can be maintained such as a concentration that is usually not greater than 100 g/l, and in many instances is from 0.1 to 120 g/l, depending on the metal treatment. For copper pickling, the peroxide concentration is often from 10 to 50 g/l and for copper polishing from 50 to 120 g/l, and for steel or titanium treatment, the concentration is often from 0.1 to 10 g/l. In the steel pickling solutions, there is often present ferric ions in solution at a concentration of between 15 and 150 g/l, most preferably complexed, when a positive concentration of hydrogen peroxide is present too. In other pickling solutions, some residual ferrous iron remains, and in such solution the hydrogen peroxide is consumed rapidly in oxidising ferrous iron, preferably also complexed so that the peroxide is transient and not maintained at a positive concentration.

The concentration of the stabilizer in the acid solution (ie the total of components a), b) and c) calculated as the respective acid, is often provided in the range of from 50 ppm to 10 g/l and in many instances is selected in the range of from 200 ppm to 1 g/l, it being recognised that the practical upper limit for component a), which typically contributes in the region of 50 to 60% by weight of the stabiliser, will often be dependent on the solution temperature, a higher temperature permitting a higher concentration. The skilled person can readily carry out trials to determine the most appropriate concentration of the stabiliser in solution, balancing the cost of additional stabiliser or saving from using less stabiliser against the corresponding stability of the hydrogen peroxide and hence, respectively, the saving from reducing its rate of decomposition or the cost of permitting it to decompose a little more quickly. Advantageously, it has been found that in the trials conducted hitherto, variation in stabiliser concentration has not affected the rate at which the solution carries out the metal treatment, so that the user can continue to employ the processing conditions determined for the use of corresponding solutions employing alternative stabilisation systems for the hydrogen peroxide.

The stabiliser can, if desired, be added into the acidic metal treatment solutions separately from the hydrogen peroxide, possibly dissolved in one or other of the mineral acids added to maintain acidity, but most conveniently at least part of the stabiliser can be introduced via the hydrogen peroxide solution. For example a suitable initial concentration of stabiliser in the bath can be provided either by direct introduction of stabiliser or by recycle of a previously used bath liquor, often after an intervening treatment to lower the concentration of dissolved metal in the liquor, and an acceptable stabiliser level is thereafter obtained as a result of the stabiliser introduced in the hydrogen peroxide solution.

In a further aspect of the present invention, there are provided concentrated hydrogen peroxide solutions containing the stabiliser a) from 80 to 200 parts and preferably 100 to 150 parts by weight of a hydroxybenzoic acid b) from 50 to 120 parts and preferably from 60 to 100 parts by weight of a hydrotropic aryl sulphonic acid c) from 2.5 to 6 parts and preferably from 3 to 5 parts by weight of a hydrophobic alkaryl sulphonic acid.

at a concentration of from 3 to 10 g/l.

In such concentrated solutions, the concentration of hydrogen peroxide is often from 35 to 70% w/w.

By incorporating the stabiliser in the hydrogen peroxide solution, the presence of the stabiliser in the desired ratio of components a) b) and c) can be ensured. This simplifies the treatment process since the process user no longer needs to monitor for stabiliser content. It will also be recognised that by incorporating the invention stabiliser in the hydrogen peroxide solution, the process carries a built-in mechanism to offset losses from solution caused by carry-out solution from the treatment bath on the workpiece or by extraction by air or any other gas which some users may wish to employ to agitate the bath and/or provide a supplementary source of oxygen, and the subsequent replenishment of the bath solution with fresh acid that does not contain stabiliser.

When the stabiliser is incorporated into the hydrogen peroxide solution, it can be convenient to monitor its pH, and adjust to a pH in the range of from 3.2 to 3.8, by for example the introduction of a soluble alkali such as sodium hydroxide.

In a further aspect of the present invention, there are provided processes for treating metal surfaces in which a metal surface that is partly or completely covered with an oxide layer is brought into contact with an acidic solution of hydrogen peroxide and a stabiliser therefor at a concentration that is effective at stabilising and maintained in contact until at least a fraction of the oxide layer has been removed characterised in that the stabiliser comprises a) from 80 to 200 parts and preferably 100 to 150 parts by weight of a hydroxybenzoic acid b) from 50 to 120 parts and preferably from 60 to 100 parts by weight of a hydrotropic aryl sulphonic acid c) from 2.5 to 6 parts and preferably from 3 to 5 parts by weight of a hydrophobic alkaryl sulphonic acid.

The metal treatment processes can be conducted under the operating conditions and employing acid and hydrogen peroxide concentrations that have hitherto been described or used for carrying out the respective treatment, but using other stabilisers for stabilising the acidic metal treatment solution, such a hydroxybenzoic acid in conjunction with components different from b)+c). The actual conditions employed will take into account the metal surface being treated, the concentrations of active constituents in the acid solution and the operating temperature. The acid solutions employed are often in accordance with or similar to the acid solutions described hereinabove. The process temperature is often in the region of from 20 to 80° C. and for many operations is selected in the range of from 35 to 60° C. The period of time that the metal surface remains in contact with the acidic solution depends on the factors identified above and often determined in practice by ranging trials or from prior use of corresponding acidic peroxide treatment solutions using a different stabiliser. In many instances, the contact time is selected in the region of from 30 seconds to 40 minutes.

It will be recognised that in accordance with possible process variations, the hydrogen peroxide (and particularly hydrogen peroxide containing the stabiliser) can be introduced to maintain a predetermined electropotential, eg 350 to 400 mV relative to a calomel electrode for steel pickling, or to maintain a specified concentration of hydrogen peroxide in the solution or within a predetermined range of concentrations.

Having described the invention in general terms, specific embodiments thereof are described in greater detail by way of example only.

EXAMPLE 1

In this Example, a stabilised hydrogen peroxide solution was prepared suitable for employment in metal treatment processes. PHBA (p-hydroxybenzoic acid, 3 g) was charged into aqueous hydrogen peroxide (35% w/w, 994 g) and stirred at laboratory ambient until by eye the solids had dissolved. PTSA (p-toluene sulphonic acid, 2 g) was likewise charged into the mixture with stirring and dissolved at ambient and thereafter DBSA (dodecylbenzene sulphonic acid, 10% w/w active material, 1 g) was gently stirred into the mixture to avoid frothing. The resultant composition contained 3 g/l component a), 2 g/l component b) and 0.1 g/l component c).

EXAMPLE 2 AND COMPARISONS C3 TO C7

In this Example and comparisons, the effectiveness of the invention stabiliser is demonstrated relative to its components in the presence of a metal in solution that decomposes hydrogen peroxide.

An iron containing acid solution was prepared by dissolving ferrous sulphate (15 g/l as Fe) in aqueous sulphuric acid (63 g/l) and sufficient HF to provide uncomplexed HF in solution at 25 g/l and hydrogen peroxide solution (35% w/w containing respectively the stabiliser or components thereof) was introduced into the iron solution until the free hydrogen peroxide concentration (after oxidation of the ferrous to ferric iron) was 0.5% w/w. The hydrogen peroxide solution was produced by the process of Example 1 or the appropriate stages thereof. The complexing of the iron with HF generated $FeF_n$ complexes in solution so that the effective sulphuric acid concentration was approximately 110 g/l.

The iron-containing solution was stored at 50° C., the concentration of hydrogen peroxide therein was monitored and by interpolation, the time for half to be lost was determined (half life, t).

The composition of the stabiliser system employed and the results are summarised in Table 1 below.

TABLE 1

| Example/ | Concentration in H2O2 solution g/l | | | Half Life |
|---|---|---|---|---|
| Comp No | PHBA | PTSA | DBSA | t (mins) |
| 2 | 3 | 2 | 0.1 | 240 |
| C3 | 3 | | | 60 |
| C4 | | | 0.1 | 45 |
| C5 | | 2 | | 33 |
| C6 | 3 | 2 | | 145 |
| C7 | | 2 | 0.1 | 45 |

From Table 1, it can be seen that the Example composition was markedly superior to the components themselves and to sub-combinations of them.

EXAMPLES 8 TO 14

In these Examples, Example 2 was repeated, but at varying concentrations of the three components of the stabiliser, as summarised in Table 2 below.

TABLE 2

| | Concentration in H2O2 solution g/l | | | Half Life |
|---|---|---|---|---|
| Example | PHBA | PTSA | DBSA | t (mins) |
| 8 | 3.6 | 2.4 | 0.12 | 283 |
| 9 | 3.6 | 2.4 | 0.08 | 283 |
| 10 | 3.6 | 1.6 | 0.12 | 189 |
| 11 | 2.4 | 2.4 | 0.12 | 268 |
| 12 | 2.4 | 1.6 | 0.12 | 157 |
| 13 | 2.4 | 2.4 | 0.08 | 216 |
| 14 | 3.6 | 1.6 | 0.08 | 312 |

From Table 2, it can be seen that enhanced stabilisation was obtained when the components concentrations were varied.

EXAMPLE 15

In this Example, steel 316 was pickled with fresh solutions of iron/sulphuric acid/HF/stabilised hydrogen peroxide according to respectively Examples 8 to 14 at 50° C. In each pickle trial, it was found that the pickling was complete after 52 minutes producing a most acceptable surface finish.

EXAMPLES 16 TO 19

In these Examples, copper and brass was treated in two stages, first with a pickle solution containing 10% sulphuric acid and stabilised hydrogen peroxide according to Example 1 at ambient temperature and secondly with a polish solution containing 0.3% sulphuric acid and the stabilised hydrogen peroxide according to Example 1 at ambient temperature for the time and with the results summarised in Table 3 below.

TABLE 3

| Example | Workpiece | Pickle Time min | Polish Time min | Appearance |
| --- | --- | --- | --- | --- |
| 16 | Cu Pipe | 1 | 5 | clean, very bright |
| 17 | Brass Rod | 2 | 7 | clean very bright |
| 18 | Cu Wire 657 | 5 | 5 | clean, dull |
| 19 | Brass Wire 230 | 2 | 5 | clean very bright |

From Table 3, it can be seen that the invention stabilised hydrogen peroxide was suitable for surface treating copper and its alloys.

EXAMPLE 20

In this Example, Example 15 was repeated employing a 35% w/w hydrogen peroxide solution containing 2 g/l PHBA, 2 g/l PTSA and 0.1 g/l DBSA. The pickling was complete after 52 minutes producing an acceptable surface finish.

What is claimed is:

1. A process for treating a metal surface of a workpiece with an acidic solution containing or into which is introduced hydrogen peroxide and a stabilizer for the hydrogen peroxide, said process comprising:
   contacting the workpiece with the acidic solution containing said hydrogen peroxide and said stabilizer; and
   maintaining the workpiece in contact with the acidic solution until a fraction of an oxide layer on the metal surface of the workpiece has been removed, said stabilizer for the hydrogen peroxide consisting of:
   a) from 100 to 150 parts by weight of a hydroxybenzoic acid;
   b) from 50 to 120 parts by weight of a hydrotropic aryl sulphonic acid; and
   c) from 2.5 to 6 parts by weight of a hydrophobic alkaryl sulphonic acid.

2. The process according to claim 1, wherein the hydrogen peroxide introduced into the acidic solution is from 35 to 70% w/w.

3. The process according to claim 1, wherein the stabilizer consists of:
   a) from 100 to 150 parts by weight of hydroxybenzoic acid;
   b) from 60 to 100 parts by weight of said hydrotropic aryl sulphonic acid; and
   c) from 3 to 5 parts by weight of hydrophobic alkaryl sulphonic acid.

4. The process according to claim 1, wherein the stabilizer consists of components a):b):c) in a weight ration of 30:20:1±20%.

5. The process according to claim 1, wherein the stabilizer consists of components a):b):c) in a weight ratio of 18 to 25:20:0.8 to 1.2.

6. The process according to claim 1, wherein component a) consists of p-hydroxybenzoic acid.

7. The process according to claim 1, wherein component b) consists of p-toluene sulphonic acid.

8. The process according to claim 1, wherein component c) consists of dodecylbenzene sulphonic acid.

9. The process according to claim 1, wherein the acidic solution has a pH of less than 2.

10. The process according to claim 1, wherein the acidic solution comprises 50 to 150 g/l of sulphuric acid and 20 to 35 g/l of HF.

11. The process according to claim 1, wherein the acidic solution comprises 25 to 250 g/l of sulphuric acid.

12. The process according to claim 1, wherein the hydrogen peroxide is present in the acidic solution at a concentration of from 50 to 120 g/l.

13. The process according to claim 1, wherein the stabilizer is present at a concentration of at least 50 ppm.

14. The process according to claim 1, wherein the stabilized hydrogen peroxide has a pH of 3.2 to 3.8 obtained by introduction of a soluble alkali into said acidic solution.

* * * * *